United States Patent
Brown et al.

(10) Patent No.: US 6,604,023 B1
(45) Date of Patent: Aug. 5, 2003

(54) MANAGING AN ENVIRONMENT UTILIZING A PORTABLE DATA PROCESSING SYSTEM

(75) Inventors: Michael Wayne Brown, Georgetown, TX (US); Kelvin Roderick Lawrence, Round Rock, TX (US); Michael A. Paolini, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/560,163

(22) Filed: Apr. 28, 2000

(51) Int. Cl.$^7$ ............................................... G05D 23/00
(52) U.S. Cl. ..................... 700/276; 700/278; 700/299; 700/300; 702/3
(58) Field of Search ................................ 700/275–278, 700/299–300; 702/1–3, 81–84

(56) References Cited

U.S. PATENT DOCUMENTS

| | | | |
|---|---|---|---|
| 4,388,616 A | | 6/1983 | Machida |
| 4,897,798 A | * | 1/1990 | Cler ............................ 700/276 |
| 4,916,642 A | * | 4/1990 | Kaiser et al. ................ 700/278 |
| 5,170,935 A | * | 12/1992 | Federspiel et al. .......... 700/276 |
| 5,204,961 A | * | 4/1993 | Barlow ........................ 713/201 |
| 5,311,451 A | * | 5/1994 | Barrett ........................ 700/278 |
| 5,410,471 A | | 4/1995 | Alyfuku et al. |
| 5,544,036 A | * | 8/1996 | Brown et al. ................ 700/277 |
| 5,604,800 A | * | 2/1997 | Johnson et al. ............. 713/189 |
| 5,621,662 A | * | 4/1997 | Humphries et al. ......... 700/276 |
| 5,682,949 A | * | 11/1997 | Ratcliffe et al. ............. 700/278 |
| 5,742,920 A | * | 4/1998 | Cannuscio et al. .......... 700/299 |
| 5,751,916 A | * | 5/1998 | Kon et al. ................... 700/299 |
| 5,761,085 A | * | 6/1998 | Giorgio ........................ 700/300 |
| 5,793,646 A | * | 8/1998 | Hibberd et al. ............. 700/276 |
| 5,798,945 A | * | 8/1998 | Benda ......................... 700/276 |
| 5,848,378 A | | 12/1998 | Shelton et al. |
| 5,860,068 A | * | 1/1999 | Cook .......................... 705/26 |
| 5,892,690 A | * | 4/1999 | Boatman et al. ............ 700/276 |
| 5,971,597 A | * | 10/1999 | Baldwin et al. ............. 700/277 |
| 6,055,480 A | * | 4/2000 | Nevo et al. .................. 702/3 |
| 6,216,956 B1 | | 4/2001 | Ehlers et al. |

OTHER PUBLICATIONS

IECON '98 Proceedings of the 24$^{th}$ Annual Conference of the IEEE Industrial Electronics Society, "Monitoring Indoor Environments Using Intelligent Mobile Sensors", Aug. 30–Sep. 4, 1998.

BEST'S REVIEW, Gimme Shelter, Jul., 1999, "Smoke Detectors In Cyberspace".

* cited by examiner

*Primary Examiner*—Leo Picard
*Assistant Examiner*—Walter R. Swindell
(74) *Attorney, Agent, or Firm*—Marilyn Smith Dawkins; Bracewell & Patterson, L.L.P.

(57) ABSTRACT

Environmental indicators computed for a particular environment are converted into a transmittable data format each of the environmental indicators is computed by electronic environmental measurement device from among multiple diverse electronic environmental measurement devices. Environmental indicators are transmitted to a portable data processing system associated with a user, which analyzes each of the environmental indicators according to an environment sensitivity profile stored at the portable data processing system for the user. Control signals are determined by the portable computer system for adjusting multiple environment control systems that control the particular environment in response to the analysis, such that a particular environment is temporarily managed by a portable data processing system according to environmental sensitivities of a particular user located within that particular environment.

71 Claims, 9 Drawing Sheets

Fig. 4

| 72 | 74 | 76 | 77 |
|---|---|---|---|
| Environment Indicator measurement | Date/Time | Measurement unit | Environment zone |
| 30 | 11/12/2000/06:10:20 | Particles/cubic inch of smoke | Building 30 |
| ... | ... | ... | ... |
| 200 | 11/13/2000/07:15:12 | Particles/cubic inch of smoke | Building 30 |

| 82 | 84 | 86 | 87 | 89 |
|---|---|---|---|---|
| Type of measurement to take | Date/Time | Range | Automatic transmission to: | Environment zone |
| ... | ... | ... | ... | ... |
| Carbon monoxide | 11/18/2000/10:00:00 | 00:05:00 | Server A | Lake X |
| Carbon dioxide | 11/18/2000/10:00:00 | 00:01:00 | Server A | Lake Y |
| Pure oxygen | 11/18/2000/10:00:00 | 00:00:30 | Server B | Lake Z |

80 / 88

| User ID | Password | ... | Health restrictions | Output preference |
|---|---|---|---|---|
| GeorgeG | 45ghr5 | ... | No smoke levels greater than 30 particles/cubic inch | Colorblind ready |
| Sylvia | Gen234 | ... | No oxygen levels less than 90% pure oxygen | Large font |
| ... | ... | ... | ... | ... |

| Environmentally sensitive device | Environmental sensitivities | Environment zone |
|---|---|---|
| Machine 1 | Temperature > 90 Humidity > 50% | Zone 1 |
| Machine 2 | Temperature < 60 Humidity < 20% | Zones 1 and 2 |
| ... | ... | ... |

*Fig. 6*

MANAGING AN ENVIRONMENT UTILIZING A PORTABLE DATA PROCESSING SYSTEM

CROSS-REFERENCE TO RELATED APPLICATIONS

The present application is related to the following co-pending applications, which are filed on even date herewith and incorporated herein by reference:

(1) U.S. patent application Ser. No. 09/560,162; and
(2) U.S. patent application Ser. No. 09/560,161.

BACKGROUND OF THE INVENTION

1. Technical Field

The present invention relates in general to an environmental monitoring device and in particular to a method, system and program for monitoring multiple diverse environmental measurement devices. Still more particularly, the present invention relates to a method, system and program for utilizing a single portable data processing system to monitor and manage a particular environment from environmental indicators received from multiple diverse environmental measurement devices monitoring the particular environment.

2. Description of the Related Art

Conventional electronic environmental measurement devices provide for taking measurements that are computed to reflect a portion of the environment such as amounts of smoke, carbon dioxide, carbon monoxide, oxygen, radiation, temperature, wind speed, humidity, etc. that are in a constrained portion of the environment. Environmental measurements can be taken in solids, liquids and gases and in a constrained area or in a non-constrained area. In particular, an electronic environmental measurement device is able to translate a measurement, such as the speed of a propeller driven by the wind, into a numerical output. Numbers computed by calibrated electronic environmental measurement devices are associated with a scale of measurement that has been assigned to that type of environmental measurement. An individual may be able to consult a chart or other documentation to discern the meaning and/or implication of the computed number. For example, a computed wind speed may be compared by an individual with a chart containing advisories based on a range of wind speeds.

While conventional environmental measurement devices provide a computed number that can be utilized by an individual or group to monitor a particular portion of the environment, there is a need for electronically documenting the measured data in a timely manner. In addition, while some electronic environmental measurement devices do provide for electronically documenting the measured data, there is a need to electronically document data from multiple diverse electronic environmental measurement devices such that a comprehensive environmental profile can be determined. For example, while an individual may be able to consult a chart or other textual data to discern the meaning of a number computed by an electronic environmental measurement device, this data is not always available, may not be current, may not provide recommendations for how to respond to particular measurement values, and may not provide analysis of measurements from multiple diverse electronic environmental measurement devices.

Some environmental measurement devices are coupled to a controller that adjusts a particular aspect of a particular environment or process in response to an environment measurement or in response to a preprogrammed setting. For example, a thermostat detects the air temperature of a controlled environment and when the air temperature rises above a threshold temperature, activates an air conditioner to cool the air in the controlled environment until the detected air temperature is less than the threshold temperature. However, for example, by adjusting the humidity in a particular environment or an air speed, the effectual temperature of the particular environment is adjusted. Unfortunately, the prior art does not provide for controlling a humidifier, an air conditioner and a fan by a single device that also knows the environment needs of a user or object detected in the environment. In another example, a smart thermostat may be set to decrease the temperature of a room at a particular time, such as in the evening, and then increase the temperature in the room at another time, such as in the morning. However, a smart thermostat is typically set only for those people living in the house. A smart thermostat does not provide for automatically and temporarily updating the smart thermostat to adjust the temperature of the room where the guest is staying according to the temperature preferences of the guest.

In view of the foregoing, it is desirable that a method and system is provided for monitoring multiple diverse electronic environmental measurement devices at a single personal data processing system in order to store monitored environmental related data over a period of time, assist the user by analyzing the monitored measurements according to environmental sensitivities of people, machines, and other objects within an environment and control the adjustment of the environment according to variable environmental sensitivities.

SUMMARY OF THE INVENTION

In view of the foregoing, it is therefore an object of the present invention to provide an improved environmental measurement monitoring device.

It is another object of the present invention to provide an improved method and system for monitoring multiple diverse environmental measurement devices.

It is yet another object of the present invention to provide an improved method and system for utilizing a single portable data processing system to a monitor and manage a particular environment from environmental indicators received from multiple diverse environmental measurement devices monitoring that particular environment.

According to the present invention, environmental indicators computed for a particular environment are converted into a transmittable data format, wherein each of the environmental indicators is computed by an electronic environmental measurement device from among multiple diverse electronic environmental measurement devices. The environmental indicators are transmitted in the transmittable data format to a portable data processing system associated with a user. The data processing system analyzes each of the environmental indicators according to an environment sensitivity profile stored at the portable data processing system for the user, wherein the data processing system associated with the user is located within the particular from which the environmental indicators are measured. Control signals are determined by the portable computer system for adjusting multiple environmental control systems that control the particular environment in response to the analysis. Particular parameters of the particular environment are adjusted as controlled by the environmental control systems according to the control signals, such that a particular environment is temporarily managed by a portable data processing system according to environmental sensitivities of a particular user located within that particular environment.

All objects, features, and advantages of the present invention will become apparent in the following detailed written description.

DESCRIPTION OF THE DRAWINGS

The novel features believed characteristic of the invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

FIG. 4 illustrates a block diagram of a data storage structure for the environmental indicator storage in accordance with the method and system of the present invention;

FIG. 5 depicts a block diagram of a data storage structure for the measurement scheduler in accordance with the method and system of the present invention;

FIG. 6 illustrates a block diagram of a data storage structure for environment profiles in accordance with the method and system of the present embodiment;

DESCRIPTION OF ILLUSTRATIVE EMBODIMENT

The present invention may be executed in a variety of systems, including a variety of computing systems and electronic devices under a number of different operating systems. In a preferred embodiment of the present invention, the computer is a portable computing system such as a notebook computer, a palmtop computer, a personal digital assistant, a telephone or other electronic computing device that may also incorporate communications features that provides for telephony, enhanced telephony, messaging and information services. Preferably, in order to enable at least one of these communications features, the portable computing system is able to be connected to a network, such as the Internet by either a wired link or wireless link. However, the computer may also be, for example, a desktop computer, a network computer, a midrange computer or a mainframe computer. In addition, the computer may be a stand-alone system or part of a network such as a local-area network (LAN) or a wide-area network (WAN). Therefore, in general, the present invention is preferably executed in a computing device that performs computing tasks such as manipulating data in storage that is accessible to the computing device. In addition, the computing device includes at least one output device and at least one input device.

Figure 1:
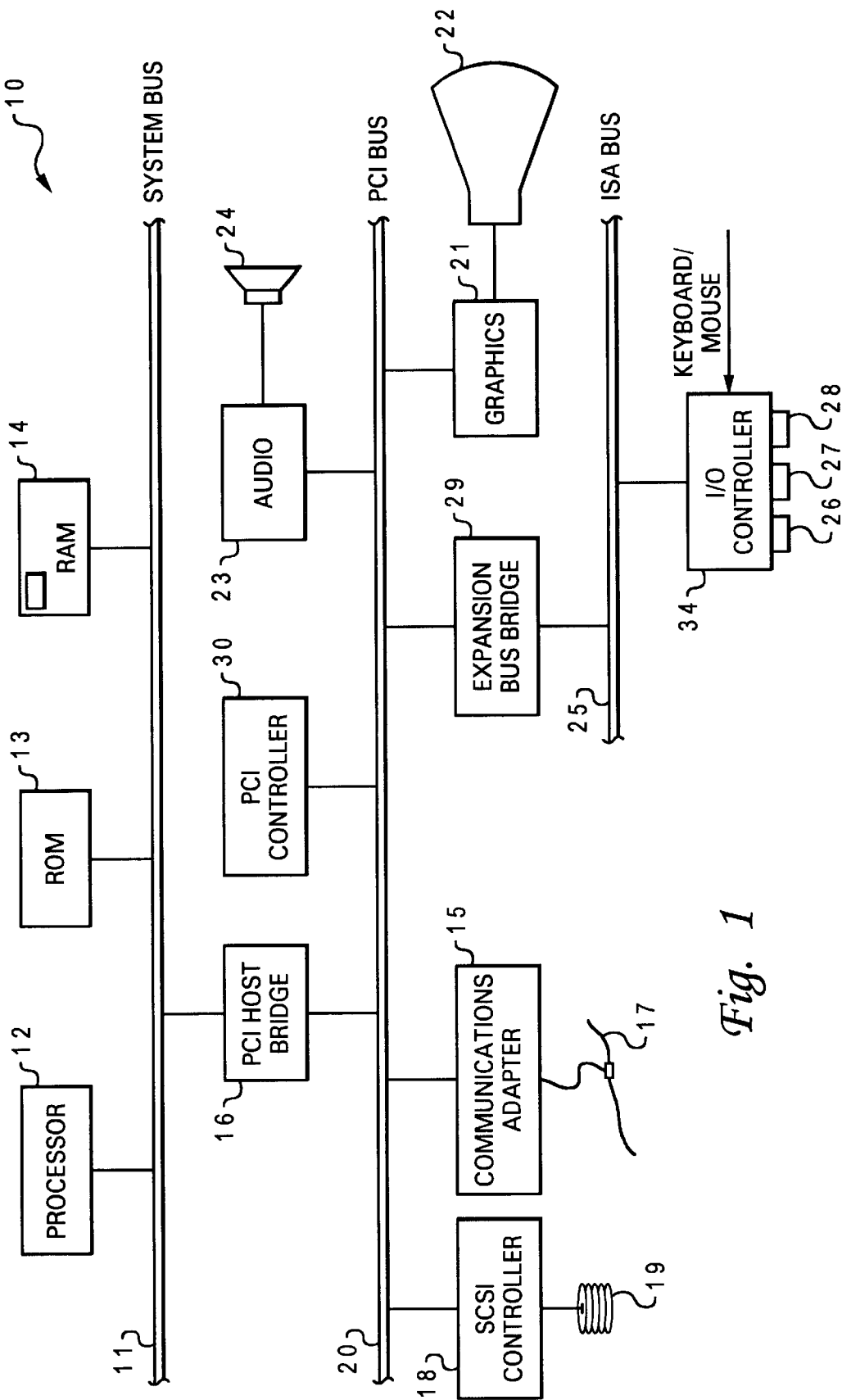
FIG. 1 is a block diagram of a computer system that may utilize a preferred embodiment of the present invention.

Referring now to the drawings and in particular to FIG. 1, there is depicted a block diagram of one embodiment of a computer system that may utilize the present invention. As depicted, data processing system 10 includes at least one processor 12, which is coupled to system bus 11. Each processor 12 is a general-purpose processor, such as IBM's PowerPC™ processor that, during normal operation, processes data under the control of operating system and application software stored in random access memory (RAM) 14 and Read Only Memory (ROM) 13. The operating system preferably provides a graphical user interface (GUI) to the user. Application software contains instructions that when executed on processor 12 carry out the operations depicted in the flowcharts of FIGS. 7, 8, 9, 10 and others described herein.

Processors 12 are coupled via system bus 11 and Peripheral Component Interconnect (PCI) host bridge 16 to PCI local bus 20. PCI host bridge 16 provides a low latency path through which processor 12 may directly access PCI devices mapped anywhere within bus memory and/or I/O address spaces. PCI host bridge 16 also provides a high bandwidth path for allowing PCI devices to directly access RAM 14.

PCI local bus 20 interconnects a number of devices for communication under the control of PCI controller 30. These devices include a Small Computer System Interface (SCSI) controller 18, which provides an interface to SCSI hard disk 19, and communications adapter(s) 15, which interface data processing system 10 to at least one data communication network 17 comprising wired and/or wireless network communications. In addition, an audio adapter 23 is attached to PCI local bus 20 for controlling audio output through speaker 24. A graphics adapter 21 is also attached to PCI local bus 20 for controlling visual output through display monitor 22. In alternate embodiments of the present invention, additional peripheral components may be added. For example, in alternate embodiments, a tactile display component may be provided.

PCI local bus 20 is further coupled to an Industry Standard Architecture (ISA) bus 25 by an expansion bus bridge 29. As shown, ISA bus 25 has an attached I/O (Input/Output) controller 34 that interfaces data processing system 10 to peripheral input devices such as a keyboard and mouse (not illustrated) and supports external communication via parallel, serial and universal serial bus (USB) ports 26, 27, and 28, respectively.

Figure 2:
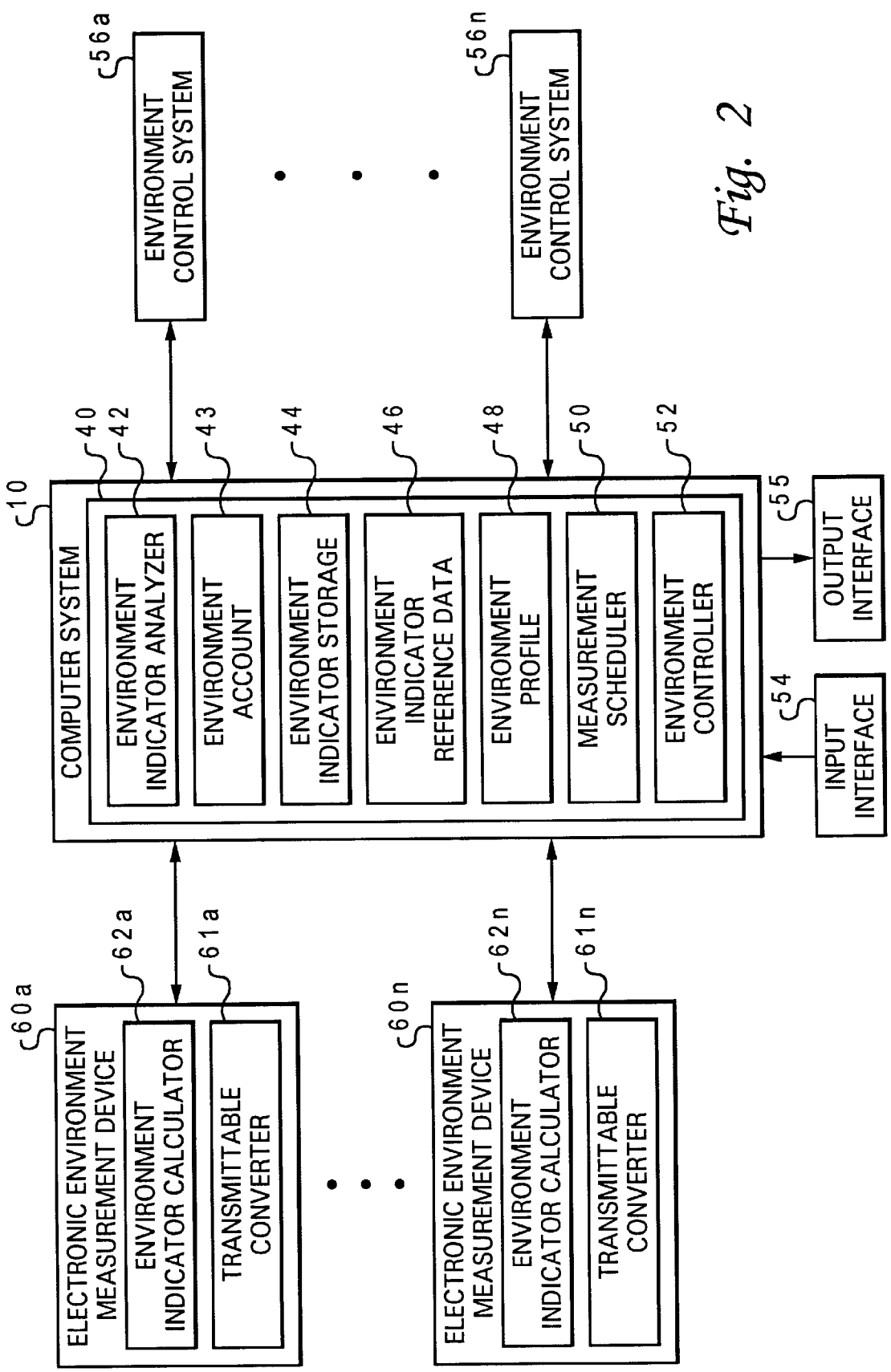
FIG. 2 illustrates a block diagram of one embodiment of an electronic environmental measurement device monitoring system in accordance with the method and system of the present invention.

With reference now to FIG. 2, there is illustrated a block diagram of one embodiment of an electronic environmental measurement device monitoring system in accordance with the method and system of the present invention. As depicted, computer system 10 communicates with multiple diverse electronic environmental measurement devices 60a–60n via a communications medium (or across a communication interface). Moreover, computer system 10 communications with multiple diverse environmental control systems 56a–56n via a communications medium. In addition, computer system 10 may communicate with other data processing systems (not shown) via a communications medium. The communications medium may comprise wired or wireless communications or other communications media that enables transmission of data. Moreover, the communications medium may comprise a network, such as the Internet, or a direct data link.

In a wired embodiment of the communications medium, for example, electronic environmental measurement devices 60a–60n and environmental control systems devices 56a–56n are connected to computer system 10 via parallel, serial, or USB ports, or the communication adapter as depicted in FIG. 1. In a wireless embodiment of the communications medium, for example, electronic environmental measurement devices 60a–60n and environmental control systems 56a–56n are wirelessly connected to computer system 10 via infrared, radio frequency (RF), cellular and other wireless transmissions which are detected by computer system 10. Wireless transmissions between computer system 10 and electronic environmental measurement devices 60a–60n and environmental control systems devices 56a–56n may occur passively or actively.

Data exchange across the communications medium is advantageously performed in at least one of multiple available data transmission protocols and is preferably supported by a common data structure format, such as the extensible mark-up language (XML)data structure format. Data transmission protocols may include, but are not limited to, Transmission Control Protocol (TCP), Internet Protocol (IP), Hypertext Transfer Protocol (HTTP), and Bluetooth. In addition, data may be transmitted in a secure manner via encryption or by technologies, such as secure socket layer (SSL) or virtual private networks (VPN).

An example of an XML data file, as depicted below, preferably contains data that is distinguished by attributes on elements and may be wrappered within a larger element. The XML data file is intended as an example of elements and data that could be included in an XML data file transmitted from an electronic environmental measurement device that measures pollen in the air. For example, the data attributed to element "<TimeStamp> </TimeStamp>" designates the time in seconds since the Epoch, 00:00:00 Jan 1, 1970 UTC that the pollen count was recorded.

<POLLENCOUNT TimeStamp="888965153"
TimeRange="888965153,888965158" LatLon="36.58, −121.85"
Elevation="77" MachineID="123456" LocationName="MONTEREY PENINSULA" DeviceType="Pollen Meter"
IPAddress="192.168.1.1" PollenCount="7766">

A second example of the same data in an alternate XML data format that includes elements is illustrated below.

<TimeStamp>888965153</TimeStamp>
<TimeRange>888965153,888965158</TimeRange>
<LatLon>36.58, −121.85</LatLon>
<Elevation>77</Elevation>
<MachineID>123456</MachineID>
<LocationName>MONTEREY PENINSULA</LocationName>
<DeviceType>Pollen Meter</DeviceType>
<IPAddress>192.168.1.1</IPAddress>
<PollenCount>7766<PollenCount>

In the examples, an electronic pollen meter takes pollen readings at a particular latitute/longitude of 36.58/−121.85 where numbers are positive for Northern latitudes and Eastern longitudes. In addition, the elevation in meters above sea level and the time taken are included. Moreover, a machine identifier, name of the location, and Internet Protocol (IP) address are included for further specifying the pollen count taken.

In the example of the XML data format as the common transmittable data structure format, a data validation file such as a document type definition (DTD) or schema is preferably utilized to validate XML data files. In addition, a schema preferably translates multiple XML data files. Moreover, a style sheet such as an extensible stylesheet language (XSL) file is preferably utilized to provide a style specification for the XML data at the receiving system. In particular, DTDs, schemas, and XSL files may be, for example, transmitted with an XML data file to a receiving system or downloaded at the receiving system from an alternate source.

In the present examples, the DTD or schema would verify that all the data required for an environmental measurement is included in the XML data file. In addition, in the present examples, the XSL file would determine the output capabilities of the receiving system and accordingly filter the presentation of the XML data at the receiving system. For example, the XSL file may translate the XML data into a browser display where the colors, fonts, and sizes of the data are determined by the XSL file.

Environmental measurement devices 60a–60n preferably comprise multiple diverse environmental measurement devices, such as a smoke detector, carbon dioxide monitor, humidity monitor, and other monitoring devices that monitor at least one aspect of an environment. Each of environmental measurement devices 60a–60n preferably comprises a environmental indicator calculator 62a–62n. Environmental indicator calculators 62a–62n preferably compute a numerical environmental indicator of environmental data measured by environmental measurement devices 60a–60n for an environment. In particular, in computing numerical environmental indicators, the computed numbers are preferably associated with a scale of measurement that has been assigned to that type of environmental measurement. For example, wind speed is preferably measured in knots or miles/hour.

Environmental indicators computed by environmental indicator calculators 62a–62n are preferably converted into a common transmittable data format by transmittable converters 61a–61n, such as XML, and transmitted via the communications medium to computer system 10. While in the present embodiment transmittable converters 61a–61n are depicted as internally accessible to environmental measurement devices 60a–60n, in alternate embodiments transmittable converters 61a–61n may be remotely accessible to environmental measurement devices 60a–60n at, for example, an alternate data translation server.

It is important to note that environmental measurement devices 60a–60n may broadcast environmental indicators in the common transmittable data format to any device or may selectively transmit the environmental indicators to particular data processing systems. In addition, it is important to note that the location of environmental measurement devices 60a–60n may be determined by the position from which environmental measurement devices 60a–60n broadcast or selectively transmit environmental indicators. Or alternatively, each environmental measurement devices 60a–60n may be equipped with a global positioning system (GPS) that passively detects a location and transmits that location with the environmental indicators in the common transmittable data format.

Computer system 10 preferably accesses a data storage medium 40 that includes, but is not limited to including, an environmental indicator analyzer 42, an environment account 43, an environmental indicator storage 44, an environmental indicator reference 46, an environment profile 48, a measurement scheduler 50, and an environmental controller 52. In the present embodiment, data storage medium 40 is accessible locally to computer system 10, however in alternate embodiments data storage medium 40 may be externally or remotely accessible to computer system 10, such as via a network connection.

Computer system 10 may receive environment indicators from environmental measurement device 60a–60n that describe multiple environments that are local or remote to a user. Environmental indicators transmitted from environmental measurement devices 60a–60n to computer system 10 may be automatically stored in environmental indicator storage 44. Environmental indicator storage 44 preferably utilizes a data storage structure for storing environmental indicators according to, for example, date and time taken and the type of environmental measurement device received from. Each environmental indicator received at computer system is preferably analyzed by environmental indicator analyzer 42 to provide the user with an analysis of the most recently received environmental indicator and update an analysis of a portion of the environment. In addition, environmental indicator analyzer 42 is preferably enabled to perform a variety of analysis including, but not limited to, a comprehensive overview of a particular environment according to all the environmental indicators received, an overview of a particular environment according to environmental indicators received over a particular period of time, and an overview of a particular environment according to the environmental measurement device utilized.

Environmental indicators received at computer system 10 may be filtered according to particular categories of environmental indicators and according to particular time period prior to storage in environmental indicators storage 44 such that a selection of types of environmental indicators are logged at computer system 10 over a particular time period. For example, filters may be designated such that only environmental indicators that measure temperature and humidity for the next two days are stored. Environmental indicators logged in environmental indicator storage 44 provide an environmental exposure history for a particular human, animal, machine or controlled environment that may be transmitted to other data processing systems for further analysis. For example, environmental exposure history for a user may be transmitted to a physician's computer in order for the physician to aid the physician in a diagnosis for the user.

In addition to receiving environmental indicators from environmental measurement devices 60a–60n, a user may input environmental indicators into computer system 10 via an input interface 54 including, but not limited to, a keyboard, a mouse, a stylus, and a vocal recognition system. For example, a user may measure a water level with a ruler and enter the measurement into computer system 10 rather than utilizing an electronic environmental measurement device that detects and computes a water level. In addition, a user may input environmental indicators into computer system 10 that are detected and computed by an environmental measurement device that is not enabled to transmit environmental indicators. Measurements entered by a user via input interface 54 are preferably automatically stored in environmental indicator storage 44 of computer system 10.

Environment profile 48 includes environmental sensitivity profiles of environment related and non-environment related data for a person, machine, animal or other object. For example, a person's birth date, height, physical disabilities, injuries, doctors' information, allergies, health restrictions and other relevant data may be provided. For machines, animals and other objects, environmental sensitivities such as temperature requirements, water requirements, and air requirements may be included. Environmental indicator analyzer 42 may utilize data for a person, machine, animal or groups of people, machines and animals, in analyzing environmental indicators. For example, if several environmental measurement devices measure allergens in the air, such as molds and multiple types of pollen, the allergen measurements would be analyzed in view of a person's allergies and warnings recommended to the person if the allergen levels exceed those tolerable by the person. In another example, water depth measurements and wind measurements might be analyzed for a particular boat in view of the water depth requirement and wind endurance specified in the boat's environment profile.

In addition, environment profile 48 may include multiple types of security methods and filters designating multiple levels of security for data stored on computer system 10. For example, the user may indicate that certain parts of environment profile 48, such as the user's physical disabilities are to be shielded from transmittal and access unless a password is supplied. In another example, the user may indicate that only certain types of environmental indicator measurements are transmittable to and/or accessible by an outside source via a network connection.

Environmental indicator reference 46 preferably comprises reference data for each of the types of environmental indicators measured by environmental measurement devices 60a–60n. Data within environmental indicator reference 46 can preferably be accessed by the user according to the environmental measurement device or type of environmental indicator. In addition, environmental indicator analyzer 42 may utilize data provided in environmental indicator reference 46 in analysis and may include or point to data in environmental indicator reference 46 in analysis reports provided to the user or to a system. Data stored within environmental indicator reference 46 may be downloaded and updated.

Results of analysis performed by environmental indicator analyzer 42 is preferably output to the user via output interface 55 according to output preferences set by the user in environment profile 48. The user-designated output preferences may designate output to multiple types of peripherals accessible to computer system 10. Examples of peripherals include, but are not limited to a graphical display, an electronic paper, an audio speaker, audio headphones, a tactile detectable device, or a printer. In particular, the user may select and provide the type of output device and may upgrade the type of output device as technology advances. The output preferences may include, but are not limited to specifications such as the size, type and coloring of a font in a graphical display, the type of tactile-detectable output (e.g. Braille), the language or the metric amount displayed.

For a graphical display, the user can preferably select from and switch between multiple types of data presentations. For example, the user may select to view of chart or graph of the analyzed data. Alternatively, the user may select to view a spreadsheet representation of the analysis. As previously described, presentation of the data may include data from environmental indicator reference 46 or may provide a selectable link to particular data within environmental indicator reference 46. Additional types of data presentations which are not described here may also be utilized for displaying the analyzed data from environmental indicator analyzer 42.

In response to analysis performed by environmental indicator analyzer 42, a control signal determined by environmental controller 52 may be output to environmental control systems 56a–56n to request adjustment to the environment as controlled by those systems. For example, in the case where a new server system is moved into a particular office and an environment profile for the new server system is stored in environment profile 48 of a computer system 10 proffered for the new server system by a server technician, computer system 10 would preferably access an environmental monitoring device, such as a temperature sensor, that detects the temperature of the particular office. The detected temperature would be analyzed in view of the environment profile 48 from the new server system. If analysis determines that the new server system is expected to add a particular amount of heat to the ambient air in the office and requires a particular ambient air temperature and humidity according to environment profile 48, then environmental controller 52 would determine and transmit a control signal for the air conditioning control system and humidifier controlling the ambient air temperature for the particular office. In response to receiving the control signals, the air conditioning control system and humidifier controller would adjust output accordingly to meet the environmental sensitivity needs for the new server system. In particular, the control signals would preferably adjust current settings at the air conditioning control system and humidifier controller as long as the new server system is operational in the particular office.

In the same case, included within environment profile 48 of computer system 10 is environmental sensitivities for the server technician. For example, the server technician is expected to add a particular heat to the ambient temperature of the particular office while working on the new server system. Environmental controller 52 would determine control signals for the air conditioning control system and humidifier controller to control the ambient air temperature of the particular office in view of the new server system and the server technician. In response to receiving the control signals, the air conditioning control system and humidifier controller would adjust output accordingly. However, when the server technician is done working, the server technician would indicate that his profile should be removed from analysis for the particular room. Thereafter, environmental controller 52 would determine control signals in view of only the new server system and transmit the control signals to the air conditioning control system and humidifier controller. Alternatively, environmental controller 52 may provide individual control signals for each environmental sensitivity such that when the server technician is ready to leave, environmental controller 52 indicates to the air conditioning control system and humidifier control system that the control signal for the server technician can be removed from a list of elements within the particular office.

In a larger example, such as an auditorium, the personal computer system for each person entering the auditorium detected would be detected and each person would be asked if they would like to connect to a local RF area network. Each user that connects to the network would receive environmental indicators detected for the auditorium and transmitted to their personal computer system via the local area network. The environmental indicators would be analyzed in view of the environment profile for the person at their personal computer system. Control signals determined by each personal computer system would be transmitted via the local area network to environmental control systems for controlling the environment of the auditorium. The environmental control systems preferably filter through the control signals and negotiate between conflicting control signals. In addition, in the example of an air conditioning control system, the air conditioning control system might incrementally decrease the ambient air temperature in the auditorium as the number of personal computer systems are detected increases and incrementally increase the ambient air temperature as the number of personal computer systems detected decreases. Moreover, the environmental control systems preferably detect patterns of people traveling through the auditorium and may predictively adjust the ambient air temperature of the auditorium to accommodate an estimated number of people as predicted from previously detected computer systems and control signals.

In addition, in response to analysis performed by environmental indicator analyzer 42, computer system 10 may provide warnings or recommendations to a particular user of whether or not an environment is suitable for the particular user. For example, a user may monitor an remote environment that is part of a travel itinerary for the user via environment indicators measured by environment measurement devices 60a–60n and transmitted via a wireless communication medium to computer system 10. If environment indicator analyzer 42 detects a conflict between the remote environment as represented by the environmental indicators, then a warning or recommendation may be provided to the user such that the user can adjust the travel itinerary without being exposed to the remote environment.

Measurement scheduler 50 provides control of preset scheduling of when particular types of environmental measurements need to be taken and controls whether or not the computer system is to automatically transmit the environmental indicator measurements to a particular server or data storage medium. The types of environmental measurements which need to be taken from a portion of the environment and the time frame in which the measurements need to be taken, as indicated by a user or a predetermined measurement schedule, is preferably stored in measurement scheduler 50. Scheduling data from a predetermined measurement schedule may be downloaded onto computer system 10. For example, a predetermined measurement schedule may designate that a measurement of the carbon dioxide in "Building 20" needs to be measured every 2 hours. In response to the designated schedule, in one example, computer system 10 may request communication with a carbon dioxide measurement device for "Building 20" every 2 hours and remotely receive an indicator measurement of the carbon dioxide levels for "Building 20". In another example, an operator may be required to control measurement taking and acquisition of the measurement.

For each scheduled measurement, measurement scheduler 50 preferably provides a reminder or series of reminders. For example, a user may be reminded at 7 AM that a measurement needs to be taken. If a measurement has not been received by 9 AM, the user may be reminded that the grace period for taking a measurement has expired. Measurement scheduler 50 may also provide a schedule to the user of when and what measurements need to be taken each day and indicate to the user when the measurement has been received. In particular, if a measurement is not received at all, or is delayed, a record of the lack of receipt or delay may be added to environmental indicator storage 44. A user may access environmental indicator storage 44 in order to view the measurements taken for an environment and to monitor the timeliness of the measurements received.

Environment account 43 preferably includes a account information for a user or company, such as, but not limited to, a pre-paid balance, a credit card number, or checking number. In one embodiment of the present invention, for each use of environmental measurement devices 60a–60n detected at computer system 10, the environment account 43 is charged. In another example, environment account 43 may be charged for the use of an environmental control system.

Computer system 10 is advantageously a portable data processing system such as personal digital assistant, notebook computer or other computing device that is easily transportable. In addition, computer system 10 is customizable to a user's preferences. For example, a user may choose a computer system 10 with a black and white display while another user may choose a color display. Moreover, computer system 10 can be upgraded to include new features, applications, and functions without needing to upgrade environmental measurement devices and environmental control systems.

Moreover, it is important to note that a single computer system 10 is preferably enabled to detect environmental indicators from environmental measurement devices 60a–60n in multiple environments, such that computer system 10 can monitor and analyze environmental indicators in multiple diverse environments. In addition, a single computer system 10 is preferably enabled to access multiple environmental control systems 56a–56n in multiple diverse environments, such that computer system 10 can control the environment in multiple diverse environments. Moreover, computer system 10 may be carried and operated by a particular user, or may be carried and operated by a particular user on behalf of a machine, animal, or other object. In addition, computer system 10 may be attached to the machine, animal or object and operated thereby. Furthermore, computer system 10 may be left in a particular environment in order to control that environment while a human, machine, animal or other object is temporarily away from the environment.

In another aspect of the present invention, computer system 10 may temporarily determine and transmit control signals to environmental control systems 56a–56n while a user is located within a particular environment, however environmental control systems 56a–56n preferably retain control signals received from computer system 10 that indicate environment sensitivities of users. Therefore, control signals for a machine may be determined by a computer system that is associated with the machine by having an environment profile for the machine stored therein. Control signals for environmental control systems that control the environment in which the machine will operate may be determined and transmitted to the environmental control systems. Once the environmental control systems have received a control signal for the machine, computer system 10 is not necessary unless further monitoring of the environment is required.

Figure 3:
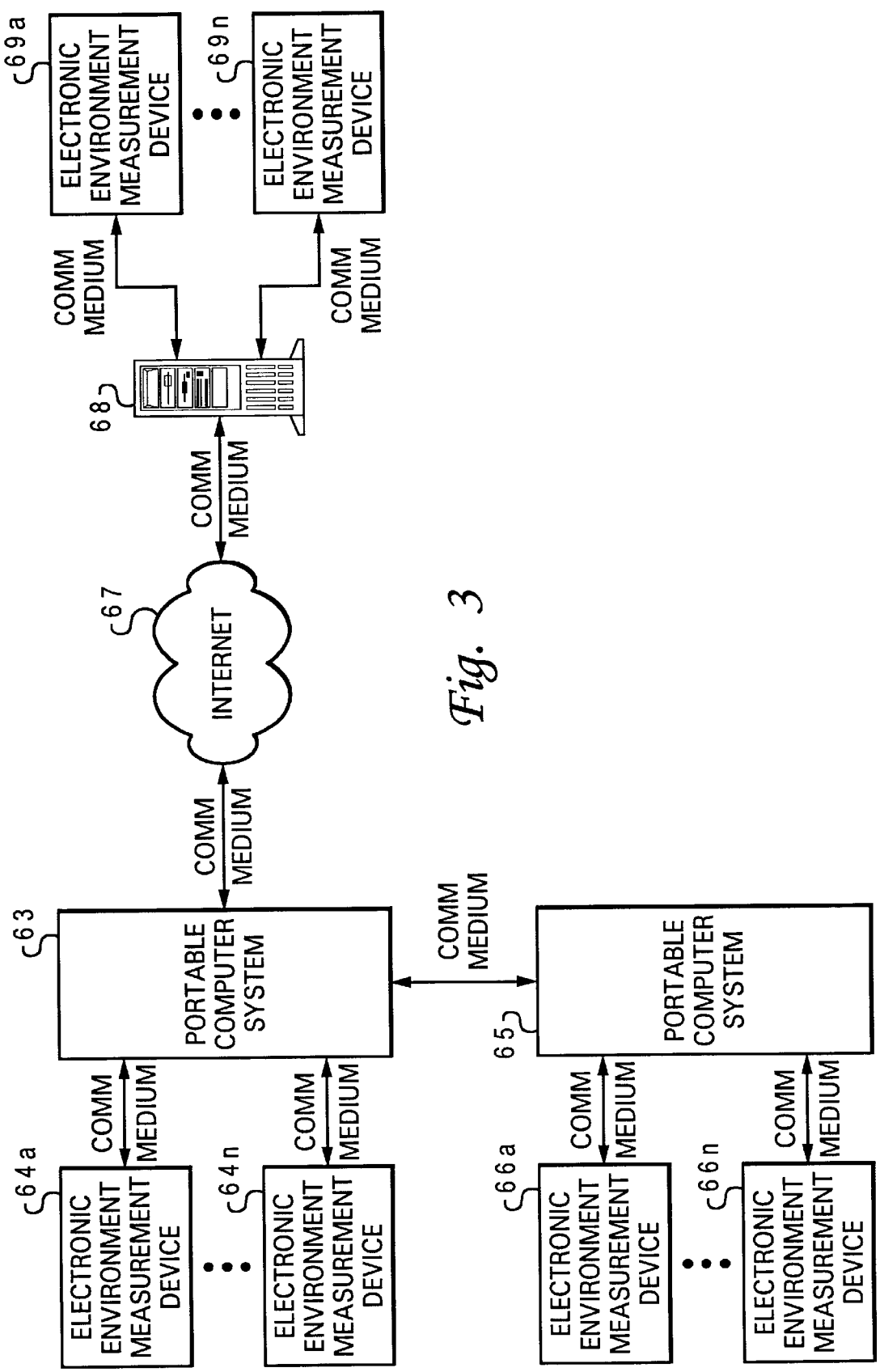
FIG. 3 depicts a block diagram of an electronic ecology network system in accordance with the method and system of the present invention.

Referring now to FIG. 3, there is depicted a block diagram of an electronic ecology network system in accordance with the method and system of the present invention. As illustrated, multiple portable computer systems 63 and 65 may communicate via a communications medium to make up an electronic ecology network system (eCoNetworkSystem). In addition portable computer system 63 communicates via an Internet 67 with a server 68. Each of portable computer system 63 and 65 and server 68 are provided with access to multiple electronic environmental measurement devices 64a–64n, 66a–66n, and 69a–69n, respectively. In the example, electronic environmental measurement devices 64a may represent a thermometer and electronic environmental measurement device 64n represents a barometer, both affixed to portable computer system 63. Portable computer system 65 is preferably enabled to access the temperature and barometer readings recorded at portable computer system 63 through an RF transmission. Alternatively, portable computer system 63 may access environmental indicators recorded at server 68. In addition, portable computer system 65 may access those environmental indicators received at portable computer system 63 from server 68.

In an application of the example depicted in FIG. 3, portable computer system 63 has an electronic thermometer that measures the temperature of the air dependent upon the location of the user of portable computer system 63. Portable computer system 65 also has an electronic thermometer that measures the temperature of the air dependent upon the location of the user of portable computer system 65. Preferably, both computer systems are enabled to access the temperature reading and location of the other computer system. In addition, a graphical map of the area may be included on the computer systems such that a graphical mapping of the location of a particular temperature measurement can be depicted. If both computer systems are accessing each other, then a bartering agreement between the two systems may be reached. However, if for example, only portable computer system 65 is accessing the temperature reading from portable computer system 63, then portable computer system 65 may be required to transfer a micropayment of a negligible amount, such as 0.01 cents, per access to portable computer system 63. In addition, server 68 may access the temperature reading and location of portable computer system 63 and transfer a micropayment of a negligible amount, such as 0.02 cents, per access to portable computer system 63. Server 68 might function, for example, to gather multiple current temperature readings from multiple portable computer systems within a particular region or regions.

It is important to note a portable computer system or server system may broadcast environmental indicators with a location associated to all devices or may selectively transmit environmental indicators with a location associated to a selected group of devices. Moreover, it is important to note that a portable computer system or server system may be equipped with a global positioning system (GPS) that passively receives a location and transmits the location with the environmental indicators in the transmittable data format. In addition, usage of environmental indicators at one portable computer system or server system that are proffered from another portable computer system or server system may be metered such that micropayments may be required in order to access environmental indicators recorded at a particular portable computer system or server system.

Referring now to FIG. 4, there is depicted a block diagram of a data storage structure for the environmental indicator storage in accordance with the method and system of the present invention. As depicted, a data storage structure 70 comprises multiple categorized entries. Environmental indicators and other data from multiple types of environmental measurement devices may be stored in data storage structure 70 as translated a data file in the common transmittable data format, such as the XML data structure format. While one type of data storage structure is depicted, in alternate embodiments, alternate types of data storage structures may be utilized. Moreover, while particular categories are designated and depicted in data storage structure 70, additional and alternate categories may be designated and depicted in data storage structure 70 in alternate embodiments of the present invention.

A first category indicated at reference numeral 72 includes environmental indicator measurements. Next, a second category indicated at reference numeral 74 designates the date and time that the indicator measurement was taken. Thereafter, a third category indicated at reference numeral 76 includes the measurement unit. Moreover, a category depicted at reference numeral 77 designates the environment zone from which the measurement was received. In the example provided, multiple entries are provided in each category as depicted at reference numeral 78. For example, on "11/20/2000" at "06:10:20" a second-hand smoke reading was received where 30 particles/cubic inch were detected in "Building 30". Later, on "11/13/2000" at "07:15:12" a second-hand smoke reading was received where 200 particles/cubic inch were detected in "Building 30".

With reference now to FIG. 5, there is illustrated a block diagram of a data storage structure for the measurement scheduler in accordance with the method and system of the present invention. As depicted, a data storage structure 80 comprises multiple categorized entries. Measurement scheduling for multiple types of environmental measurement devices may be stored in data storage structure 80 as translated a data file in the common transmittable data format, such as the XML data structure format. While one type of data storage structure is illustrated, in alternate embodiments, alternate types of data storage structures may be utilized. In addition, while particular categories are designated and depicted in data storage structure 80, additional and alternate categories may be designated and depicted in data storage structure 80 in alternate embodiments of the present invention.

A first category depicted at reference numeral 82 includes the type of measurement to take. Next, a second category illustrated at reference numeral 84 designates the date and time to take the measurement. Thereafter, a third category depicted at reference numeral 86 includes the range of time. Moreover, a fourth category illustrated at reference numeral 87 designates a server destination for automatic transmissions. Next, a fifth category depicted at reference numeral 89 includes the environmental zone from which the measurement. In the example provided, multiple entries are provided in each category as depicted at reference numeral 88. For example, carbon monoxide readings are scheduled to be taken on "11/18/2000" from "Lake X" at "10:00:00" with a range of "00:05:00" flexibility in receiving the measurement. When the carbon monoxide indicator is received, the measurement is to be automatically transmitted to "Server A".

Referring now to FIG. 6, there is depicted a block diagram of a data storage structure for environment profiles in accordance with the method and system of the present embodiment. As illustrated a data storage structure 90 comprises multiple categorized entries. Environment profiles for multiple users and environmentally sensitive devices may be stored in data storage structure 90. While one type of data storage structure is illustrated, in alternate embodiments, alternate types of data storage structures may be utilized. Moreover, while particular categories are designated and depicted in data storage structure 90, additional and alternate categories may be designated and depicted in data storage structure 90 in alternate embodiments of the present invention.

A first category depicted at reference numeral 92 includes the userID. Next, a second category illustrated at reference numeral 93 designates the password for the userID. Thereafter, a third category depicted at reference numeral 94 includes multiple additional categories such as birth date, allergies, etc. Next, a fourth category illustrated at reference numeral 95 includes health restrictions and a fifth category depicted at reference numeral 96 includes output preferences. Alternatively, a category illustrated at reference numeral 97 includes environmentally sensitive devices, a category depicted at reference numeral 98 includes environmental sensitivities of the environmentally sensitive devices and a category illustrated at reference numeral 99 includes the environmental zones where the environmentally sensitive devices are located. In analysis of environmental indicators, a selection of users and environmentally sensitive devices may be incorporated where the selection of users and environmentally sensitive devices are within a designated portion of the environment is provided.

In the example depicted, a person with a userID "GeorgeG" has a health restriction of not being in an environment where smoke levels are greater than 30 particles/cubic inch because of a health condition. Therefore, if smoke level in an environment where GeorgeG is currently or is planning on going is greater than 30 particles/cubic inch, then GeorgeG is preferably alerted upon analysis of the smoke level indicator measurement received at the computer system. In addition, particular instructions may be provided in response to the analysis if the smoke level indicator measurement is greater than 30 particles/cubic inch. Moreover, if an environment control system, such as an air conditioning/ventilation system, is available which can adjust the environment to reduce the smoke levels, the computer system preferably transmits a control signal to that control system requesting an adjustment to the environment.

Figure 7:
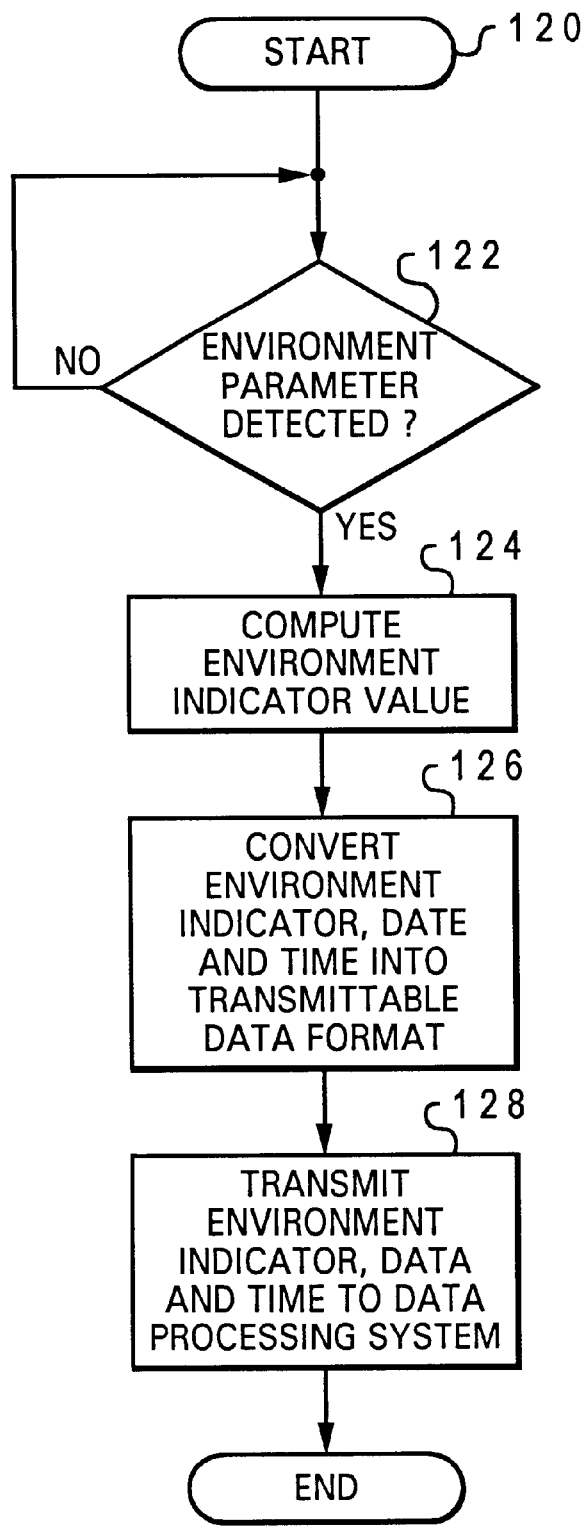
FIG. 7 depicts a high level logic flowchart of a process for transmitting environmental indicators to a personal environmental indicator monitoring system in accordance with the method and system of the present invention.

With reference now to FIG. 7, there is illustrated a high level logic flowchart of a process and program for transmitting environmental indicators to a personal environmental indicator monitoring system in accordance with the method and system of the present invention. As depicted, the process starts at block 120 and thereafter proceeds to block 122. Block 122 illustrates a determination as to whether or not a environment parameter is detected. Each environmental measurement device will detect different types of environment parameters. For example, a water level device will detect a water level for a particular body of water, while a smoke detector will detect a smoke level in a particular enclosed area. If an environment parameter is not detected, the process iterates at block 122. If a environment parameter is detected, the process passes to block 124. Block 124 depicts computing a environmental indicator value. Thereafter, block 126 illustrates converting the environmental indicator and date and time of receipt into a common transmittable data format. Next, block 128 depicts transmitting the environmental indicator and data and time of receipt to a personal environment monitor and the process ends.

Figure 8:
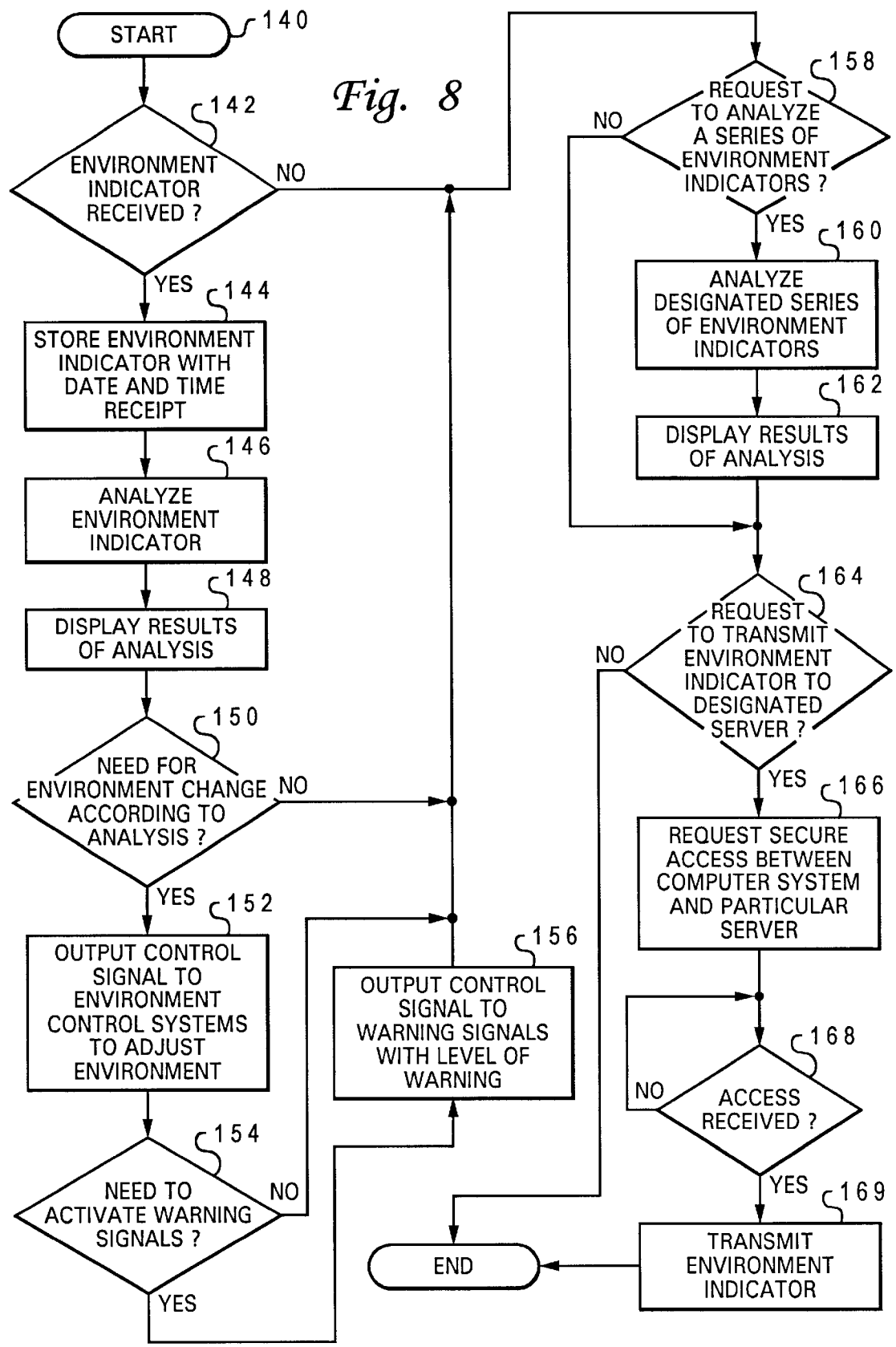
FIG. 8 illustrates a high level logic flowchart of a process and program for processing environmental indicators received at a personal environmental monitor in accordance with the method and system of the present invention.

Referring now to FIG. 8, there is depicted a high level logic flowchart of a process and program for processing environmental indicators received at a personal environmental monitor in accordance with the method and system of the present invention. As illustrated, the process starts at block 140 and thereafter proceeds to block 142. Block 142 depicts a determination as to whether or not an environmental indicator is received. If an environmental indicator is not received, the process passes to block 158. If an environmental indicator is received, the process passes to block 144. Block 144 illustrates storing the environmental indicator with data and time receipt. Thereafter, block 146 depicts analyzing the received environmental indicator. Next, block 148 illustrates displaying the analysis. In particular, the analysis may also be output to the output interface which may comprise multiple types of output devices. In addition, the analysis is preferably displayed according to any user output preferences stored in the environment profile. Thereafter, block 150 depicts a determination as to whether or not there is a need for an environmental change according to the analysis. For example, if humidity levels are detected at 50% and for a particular machine humidity levels should remain less than 50%, a need for adjustment to the environment would be detected during analysis. If there is not a need for an environmental change, the process passes to block 158. If there is a need for an environmental change, the process passes to block 152.

Block 152 illustrates outputting a control signal to an environmental control system to adjust the environment. In the example of the humidity levels, a control signal would be provided from the computer system to a dehumidifier to decrease the humidity levels. Thereafter, block 154 depicts a determination as to whether or not there is a need to activate warning signals according to the analysis. If there is not a need to activate warning signals, the process passes to block 158. If there is a need to activate warning signals, the process passes to block 156. Block 156 illustrates outputting a control signal from the computer system to warning signals, such as an alarm, with the level of warning and the process passes to block 158.

Block 158 depicts a determination as to whether or not a request to analyze a series of environmental indicators is received. In particular a request may be made to analyze a series of environmental indicators according to a time period, date, indicator type, etc as designated by the user. If a request to analyze a series of environmental indicators is not made, the process passes to block 164. If a request to analyze a series of environmental indicators is made, the process passes to block 160. Block 160 illustrates analyzing the designated series of environmental indicators. Thereafter, block 162 depicts displaying the analysis and the process passes to block 164.

Block 164 depicts a determination as to whether or not a request to transmit an environmental indicator(s) to a designated server is made. If a request to transmit an environmental indicator is not made, the process ends. If a request to transmit a environmental indicator is made, the process passes to block 166. Block 166 illustrates requesting secure access between the computer system and the designated server. Next, block 168 depicts a determination as to whether or not secure access is received. If secure access is not received, the process iterates at block 168. If secure access is received, the process passes to block 169. Block 169 illustrates transmitting the environmental indicator(s) and the process ends.

Figure 9:
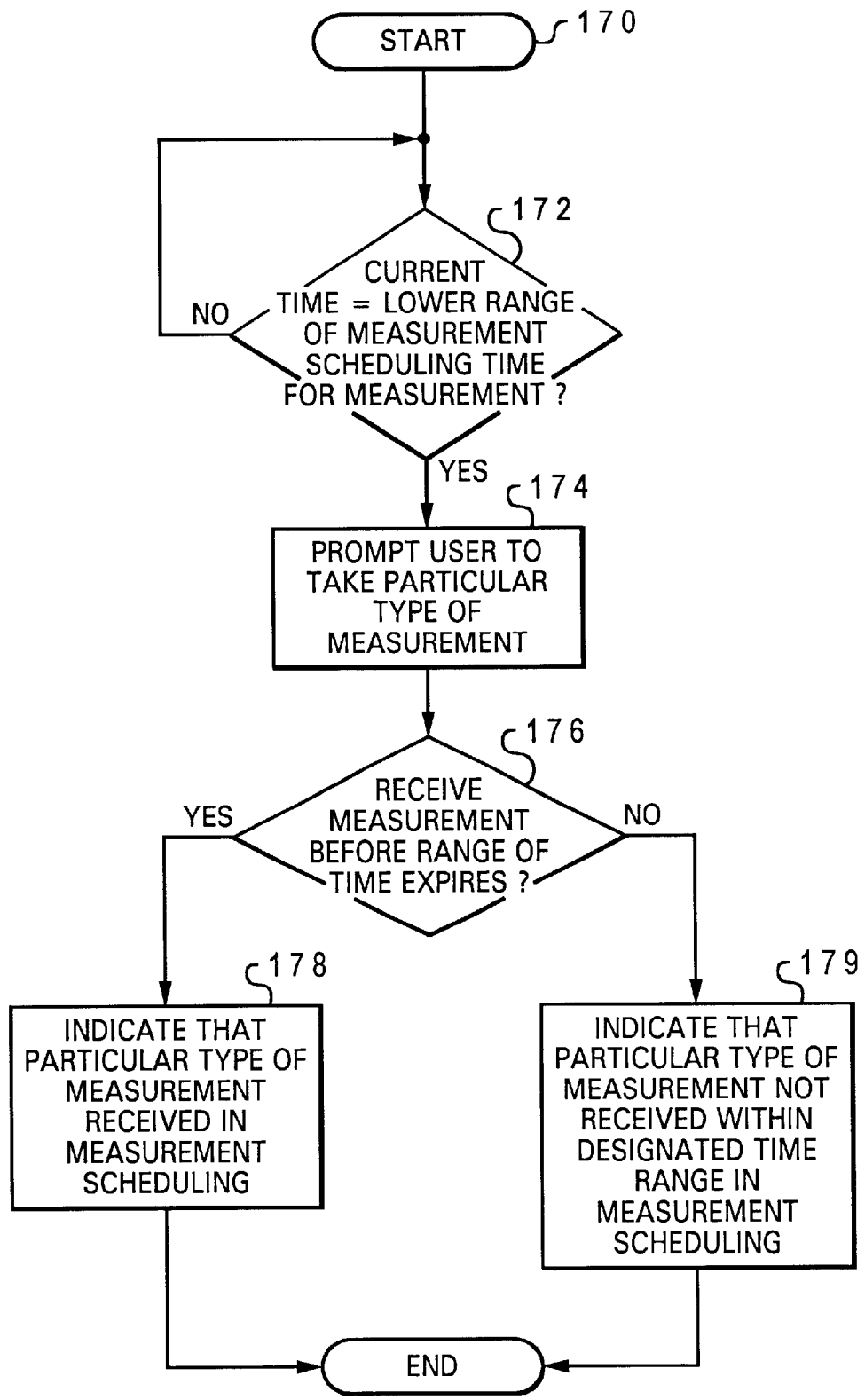
FIG. 9 depicts a high level logic flowchart of a process and program for monitoring receipt of environmental indicators in accordance with the method and system of the present invention.

With reference now to FIG. 9, there is illustrated a high level logic flowchart of a process and program for monitoring receipt of environmental indicators in accordance with the method and system of the present invention. As depicted, the process starts at block 170 and thereafter proceeds to block 172. Block 172 illustrates a determination as to whether or not the current time is equal to the lower range of a measurement scheduling time. If the current time is not equal to the lower range of a measurement scheduling time, the process iterates at block 172. If the current time is equal to the lower range of a measurement scheduling time, the process passes to block 174. Block 174 depicts prompting the user to take a particular type of measurement or the computer system to request access to a particular type of measurement according to the measurement type scheduled for the measurement scheduling time. Thereafter, block 176 illustrates a determination as to whether or not the environmental indicator measurement is received before the range of time scheduled for the measurement expires. If the measurement is received before the range of time expires, the process passes to block 178. Block 178 depicts indicating that the particular type of measurement is received in the measurement scheduling record and the process ends. If the measurement is not received before the range of time scheduled for the measurement expires, the process passes to block 179. Block 179 illustrates indicating that the particular type of measurement was not received within the designated range of time in the measurement scheduling record and the process ends.

Figure 10:
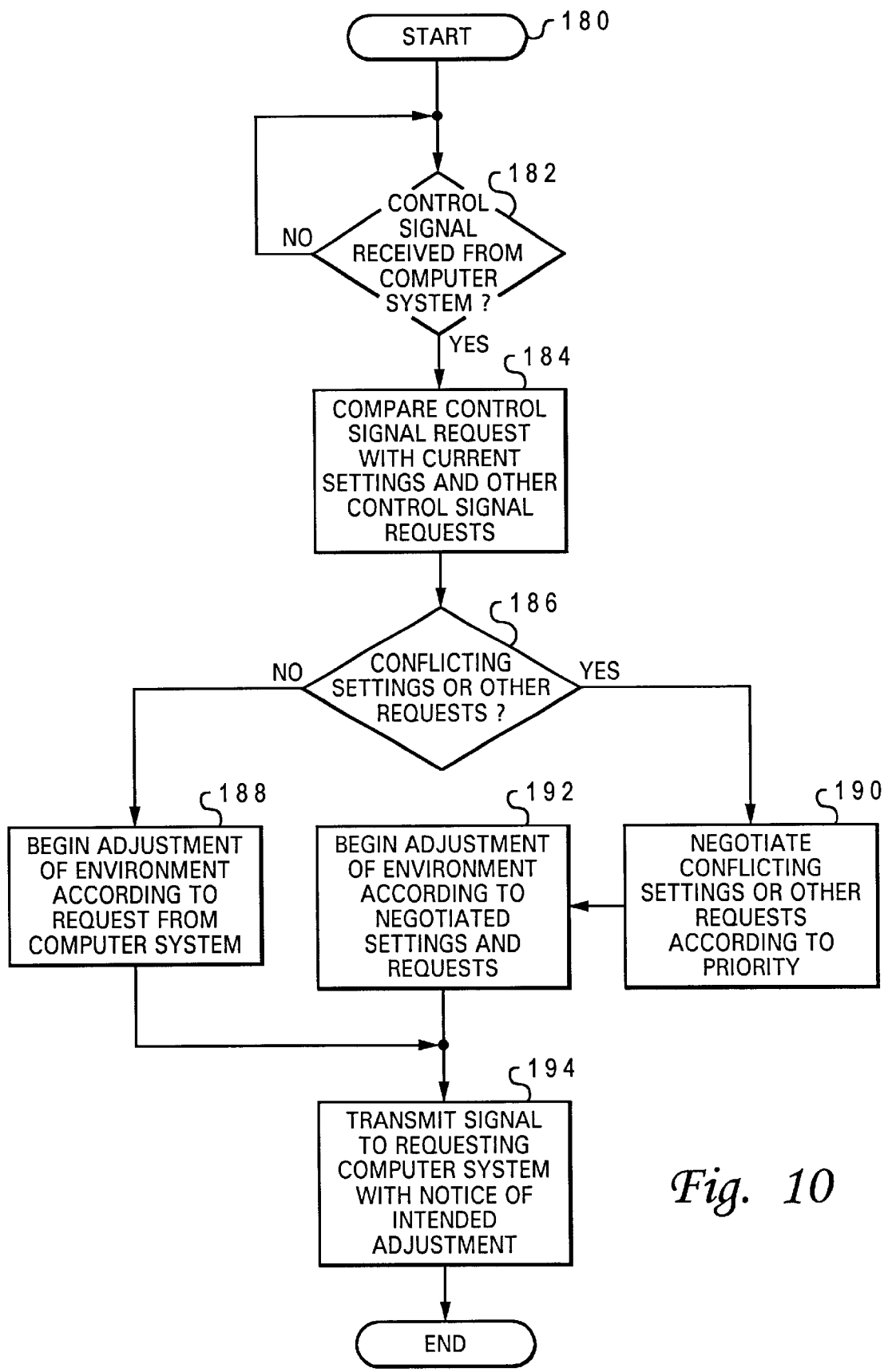
FIG. 10 illustrates a high level logic flowchart of a process and program for adjusting a controlled environment in accordance with the method and system of the present invention

Referring now to FIG. 10, there is depicted a high level logic flowchart of a process and program for adjusting a controlled environment in accordance with the method and system of the present invention. As illustrated, the process starts at block 180 and thereafter proceeds to block 182. Block 182 depicts a determination as to whether or not a control signal is received from a computer system. If a control signal is not received from a computer system, then the process iterates at block 182. If a control signal is received from a computer system, then the process passes to block 184. Block 184 illustrates comparing the control signal request with current settings and other control signal requests. Other control signal requests may be received at the environment control system from alternate computer systems. Thereafter, block 186 depicts a determination as to whether or not there are conflicting settings or other requests. If there are not conflicting settings or other requests, then the process passes to block 188.

Block 188 illustrates beginning the adjustment of the environment according to the request from the computer system and the process passes to block 194. If there is a conflicting setting or other request, then the process passes to block 190. Block 190 depicts negotiating the conflicting settings or other requests according to priority and the process passes to block 192. For example, settings for the environmental control system may be given a priority where only requests from a particular user or from a particular environmentally sensitive system will override the settings. In an alternate example, settings for the environmental control system may comprise a default that is utilized when there are not requests from computer systems. In the case where there are requests from other computer systems, priority may be given according to an ordering scheme, such as adjusting the environment in order of the received request. Block 192 illustrates beginning adjustment of the environment according to the negotiated settings and requests. Thereafter, block 194 depicts transmitting a signal to the requesting computer system with notice of intended adjustment and the process ends.

It is important to note that, although the present invention has been described in the context of a fully functional computer system, those skilled in the art will appreciate that the mechanisms of the present invention are capable of being distributed as a program product in a variety of forms, and that the present invention applies equally regardless of the particular type of signal-bearing media utilized to actually carry out the distribution. Examples of signal-bearing media include, but are not limited to, recordable-type media such as floppy disks or CD-ROMs and transmission-type media such as analogue or digital communications links.

While the invention has been particularly shown and described with reference to a preferred embodiment, it will be understood by those skilled in the art that various changes in form and detail may be made therein without departing from the spirit and scope of the invention.

What is claimed is:

1. A method for managing an environment, said method comprising the steps of:
   converting a plurality of environmental indicators computed for a particular environment from among a plurality of environments into a transmittable data format, wherein each of said plurality of environmental indicators is computed by an electronic environmental measurement device from among a plurality of diverse electronic environmental measurement devices;
   transmitting said plurality of environmental indicators in said transmittable data format to a portable data processing system associated with a particular user;
   analyzing said plurality of environmental indicators received at said data processing system according to an environment sensitivity profile of said particular user's sensitivities to environment as indicated by said environmental indicators stored within said data processing system for said particular user, wherein said data processing system associated with said particular user is located within said particular environment;
   determining a plurality of control signals at said data processing system for adjusting a plurality of environmental control systems that control said particular environment, in response to said analyzing of said plurality of environmental indicators according to an environment sensitivity profile; and
   adjusting particular parameters of said particular environment as controlled by said plurality of environmental control systems according to said plurality of control signals, such that said particular environment is temporarily managed by said data processing system according to said environment sensitivity profile for said particular user located within said particular environment.

2. The method for managing an environment according to claim 1, said step of converting a plurality of environmental indicators further comprising the step of:
   converting said plurality of environmental indicators to an extensible mark-up language data format.

3. The method for managing an environment according to claim 1, said step of transmitting said plurality of environmental indicators further comprising the step of:
   transmitting said plurality of environmental indicators in an extensible mark-up language data format.

4. The method for managing an environment according to claim 1, said step of transmitting said plurality of environmental indicators further comprising the step of:
   transmitting said plurality of environmental indicators via a wireless communications medium.

5. The method for managing an environment according to claim 1, said step of transmitting said plurality of environmental indicators further comprising the step of:
   transmitting said plurality of environmental indicators via a wired communications medium.

6. The method for managing an environment according to claim 1, said method further comprising the step of:
   outputting results from said analysis of said plurality of environmental indicators by said data processing system to an output interface.

7. The method for managing an environment according to claim 6, said step of outputting results from said analysis of said plurality of environmental indicators further comprising the step of:
   graphically displaying said results from said analysis of said plurality of environmental indicators.

8. The method for managing an environment according to claim 6, said step of outputting results from said analysis of said plurality of environmental indicators further comprising the step of:
   outputting results from said analysis according to user output preferences previously stored on said data processing system.

9. The method for managing an environment according to claim 1, said step method further comprising the step of:
   storing said plurality of environmental indicators transmitted to said data processing system on a data storage medium that is accessible to said data processing system.

10. The method for managing an environment according to claim 1, said method further comprising the step of:
    downloading data onto a data storage medium that is accessible to said data processing system, wherein said downloaded data is utilized for said analysis of said plurality of environmental indicators.

11. The method for managing an environment according to claim 1, said step of analyzing said plurality of environmental indicators further comprising the step of:
    analyzing a user-designated selection of environmental indicators from among said plurality of environmental indicators transmitted to said data processing system.

12. The method for managing an environment according to claim 1, said step of analyzing said plurality of environmental indicators further comprising the step of:
    analyzing said plurality of environmental indicators according to a "multi-user" environment profile stored on said data processing system, wherein said "multi-user" environment profile comprises environmental sensitivities for a plurality of users within said particular environment.

13. The method for managing an environment according to claim 1, said step of analyzing said plurality of environmental indicators further comprising the step of:
    analyzing said plurality of physical environmental indicators according to an environmental indicator reference stored at said data processing system.

14. The method for managing an environment according to claim 1, said step of adjusting said particular environment as controlled by said plurality of environmental control systems according to said plurality of control signals further comprising the step of:
    negotiating between conflicting control signals received at a particular environment control system from among said plurality of environmental control systems.

15. The method for managing an environment according to claim 1, said method further comprising the step of:
    adjusting said particular environment as controlled by said plurality of environmental control systems according to said plurality of control signals, in response to removal of said particular user from said particular environment.

16. The method for managing an environment according to claim 1, said method further comprising the step of:
    storing said plurality of control signals at said plurality of environmental control systems such that said plurality of environmental control systems adjust said particular environment according to environment sensitivity profiles of users within said particular environment independent of said data processing system supplying said control signals.

17. The method for managing an environment according to claim 1, said method further comprising the step of:

designating a time period during which a particular environmental indicator is expected to be received at said data processing system from a particular environmental measurement device.

18. The method for managing an environment according to claim 17, said method further comprising the step of:

in response to not receiving said particular environmental indicator during said designated time period, providing a warning due to lack of receipt of an expected environmental indicator.

19. The method for managing an environment according to claim 1, said method further comprising the steps of:

requesting a secure communication medium access to a particular server according to a server selection stored on said data processing system; and in response to receiving a secure communication medium access to said particular server, transmitting said plurality of environmental indicators to said particular server.

20. The method for managing an environment according to claim 1, said method further comprising the step of:

in response to receiving a plurality of environmental indicators at said data processing system, debiting an environment account stored at said data processing system.

21. A system for managing an environment, said system comprising:

means for converting a plurality of environmental indicators computed for a particular environment from among a plurality of environments into a transmittable data format, wherein each of said plurality of environmental indicators is computed by an electronic environmental measurement device from among a plurality of diverse electronic environmental measurement devices;

means for transmitting said plurality of environmental indicators in said transmittable data format to a portable data processing system associated with a particular user;

means for analyzing said plurality of environmental indicators received at said data processing system according to an environment sensitivity profile of said particular user's sensitivities to environment as indicated by said environmental indicators stored within said data processing system for said particular user, wherein said data processing system associated with said particular user is located within said particular environment;

means for determining a plurality of control signals at said data processing system for adjusting a plurality of environmental control systems that control said particular environment, in response to said analyzing of said plurality of environmental indicators according to an environment sensitivity profile; and means for adjusting particular parameters of said particular environment as controlled by said plurality of environmental control systems according to said plurality of control signals, such that said particular environment is temporarily managed by said data processing system according to said environment sensitivity profile for said particular user located within said particular environment.

22. The system for managing an environment according to claim 21, said means for converting a plurality of environmental indicators further comprising:

means for converting said plurality of environmental indicators to an extensible mark-up language data format.

23. The system for managing an environment according to claim 21, said means for transmitting said plurality of environmental indicators further comprising:

means for transmitting said plurality of environmental indicators in an extensible mark-up language data format.

24. The system for managing an environment according to claim 21, said means for transmitting said plurality of environmental indicators further comprising:

means for transmitting said plurality of environmental indicators via a wireless communications medium.

25. The system for managing an environment according to claim 21, said means for transmitting said plurality of environmental indicators further comprising:

means for transmitting said plurality of environmental indicators via a wired communications medium.

26. The system for managing an environment according to claim 21, said system further comprising:

means for outputting results from said analysis of said plurality of environmental indicators by said data processing system to an output interface.

27. The system for managing an environment according to claim 26, said means for outputting results from said analysis of said plurality of environmental indicators further comprising:

means for graphically displaying said results from said analysis of said plurality of environmental indicators.

28. The system for managing an environment according to claim 26, said means for outputting results from said analysis of said plurality of environmental indicators further comprising:

means for outputting results from said analysis according to user output preferences previously stored on said data processing system.

29. The system for managing an environment according to claim 21, said step system further comprising:

means for storing said plurality of environmental indicators transmitted to said data processing system on a data storage medium that is accessible to said data processing system.

30. The system for managing an environment according to claim 21, said system further comprising:

means for downloading data onto a data storage medium that is accessible to said data processing system, wherein said downloaded data is utilized for said analysis of said plurality of environmental indicators.

31. The system for managing an environment according to claim 21, said means for analyzing said plurality of environmental indicators further comprising:

means for analyzing a user-designated selection of environmental indicators from among said plurality of environmental indicators transmitted to said data processing system.

32. The system for managing an environment according to claim 21, said means for analyzing said plurality of environmental indicators further comprising:

means for analyzing said plurality of environmental indicators according to a "multi-user" environment profile stored on said data processing system, wherein said "multi-user" environment profile comprises environmental sensitivities for a plurality of users within said particular environment.

33. The system for managing an environment according to claim 21, said means for analyzing said plurality of environmental indicators further comprising:
means for analyzing said plurality of physical environmental indicators according to an environmental indicator reference stored at said data processing system.

34. The system for managing an environment according to claim 21, said means for adjusting said particular environment as controlled by said plurality of environmental control systems according to said plurality of control signals further comprising:
means for negotiating between conflicting control signals received at a particular environment control system from among said plurality of environmental control systems.

35. The system for managing an environment according to claim 21, said system further comprising:
means for adjusting said particular environment as controlled by said plurality of environmental control systems according to said plurality of control signals, in response to removal of said particular user from said particular environment.

36. The system for managing an environment according to claim 21, said system further comprising:
means for storing said plurality of control signals at said plurality of environmental control systems such that said plurality of environmental control systems adjust said particular environment according to environment sensitivity profiles of users within said particular environment independent of said data processing system supplying said control signals.

37. The system for managing an environment according to claim 21, said system further comprising:
means for designating a time period during which a particular environmental indicator is expected to be received at said data processing system from a particular environmental measurement device.

38. The system for managing an environment according to claim 37, said system further comprising:
means for providing a warning due to lack of receipt of an expected environmental indicator, in response to not receiving said particular environmental indicator during said designated time period.

39. The system for managing an environment according to claim 21, said system further comprising the steps of:
means for requesting a secure communication medium access to a particular server according to a server selection stored on said data processing system; and
means for transmitting said plurality of environmental indicators to said particular server, in response to receiving a secure communication medium access to said particular server.

40. The system for managing an environment according to claim 21, said system further comprising:
means for debiting an environment account stored at said data processing system, in response to receiving a plurality of environmental indicators at said data processing system.

41. The system for managing an environment according to claim 21, said data processing system further comprising a personal digital assistant.

42. The system for managing an environment according to claim 21, said data processing system further comprising a wireless telephone.

43. The system for managing an environment according to claim 21, said data processing system further comprising a laptop computer.

44. A program, residing on a computer usable medium having computer readable program code means, said program comprising:
means for retrieving at a portable data processing system a plurality of environmental indicators computed for a particular environment from among a plurality of environments, wherein each of said plurality of environmental indicators is computed by an electronic environmental measurement device from among a plurality of diverse electronic environmental measurement devices, wherein said portable data processing system is associated with a particular user;
means for analyzing said plurality of environmental indicators received at said data processing system according to an environment sensitivity profile of said particular user's sensitivities to environment as indicated by said environmental indicators stored within said data processing system for said particular user, wherein said particular user is located within said particular environment; and
means for computing a plurality of control signals at said data processing system for adjusting a plurality of environmental control systems that control said particular environment.

45. The program according to claim 44, said program further comprising:
means for converting said plurality of environmental indicators to an extensible mark-up language data format.

46. The program according to claim 44, said program further comprising:
means for transmitting said plurality of environmental indicators in an extensible mark-up language data format.

47. The program according to claim 44, said program further comprising:
means for outputting results from said analysis of said plurality of environmental indicators by said data processing system to an output interface.

48. The program according to claim 47, said program further comprising:
means for graphically displaying said results from said analysis of said plurality of environmental indicators.

49. The program according to claim 47, said program further comprising:
means for outputting results from said analysis according to user output preferences stored on said data processing system.

50. The program according to claim 44, said program further comprising:
means for storing said plurality of environmental indicators on a data storage medium that is accessible to said data processing system.

51. The program according to claim 44, said program further comprising:
means for downloading data onto a data storage medium that is accessible to said data processing system, wherein said downloaded data is utilized for said analysis of said plurality of environmental indicators.

52. The program according to claim 44, said program further comprising:
means for analyzing a user-designated selection of environmental indicators from among said plurality of environmental indicators.

53. The program according to claim 44, said program further comprising:

means for analyzing said plurality of environmental indicators according to a "multi-user" environment profile stored on said data processing system, wherein said "multi-user" environment profile comprises environmental sensitivities for a plurality of users located within said particular environment.

54. The program according to claim 44, said program further comprising:
means for analyzing said plurality of physical environmental indicators according to an environmental indicator reference stored at said data processing system.

55. An electronic environment management system, said system comprising:
a portable data processing system associated with a particular user;
a memory coupled to said data processing system comprising an environment sensitivity profile for said particular user;
a plurality of diverse electronic environmental measurement devices, wherein each of said diverse electronic environmental measurement devices computes a plurality of environmental indicators for a particular environment from among a plurality of environments;
a first communications interface between said personal data processing system and said plurality of diverse electronic environmental measurement devices, wherein said plurality of environmental indicators are transmitted across said first communication interface to said memory of said data processing system in a transmittable data format;
a plurality of environmental control systems that each control a particular parameter from among a plurality of parameters of said particular environment according to predetermined settings and according to control signals received from said data processing system;
a second communications interface between said personal data processing system and said plurality of environmental control systems, wherein said control signals are transmitted from said portable data processing system across said second communication interface to said plurality of environmental control systems in said transmittable data format; and
a environment controller element executable on said data processing system for analyzing said plurality of environmental indicators received at said data processing system according to said environment sensitivity profile, wherein said environment controller determines a plurality of control signals for controlling said plurality of environmental control systems, in response to said analysis of said plurality of environmental indicators according to said environmental sensitivity profile for said particular user.

56. The electronic environment management system according to claim 55, said plurality of environmental control systems further comprising a plurality of control signals previously received for a plurality of users currently located within said particular environment.

57. The electronic environment management system according to claim 55, said first communications interface and said second communications interface further comprising a local area network that detects said portable data processing system when within a particular range.

58. A method for monitoring the suitability of an environment for a particular user, said method comprising the steps of:
accessing at a portable computer system a plurality of environmental indicators computed for a particular environment by a plurality of diverse electronic environmental measurement devices and converted into a common transmittable data format;
analyzing said plurality of environmental indicators for said particular environment with an environmental sensitivity profile of said particular user's sensitivities to environment as indicated by said environmental indicators stored at said portable computer system for a particular user; and
controlling output of a recommendation of suitability of said particular environment for said particular user, in response to said analyzing of said plurality of environmental indicators with said environmental sensitivity profile, such that said particular user receives an indication of whether said particular environment is suitable for said particular user.

59. The method for monitoring the suitability of an environment for a particular user according to claim 58, said method further comprising the step of:
accessing at a portable computer system a plurality of environmental indicators computed for a particular remote environment by a plurality of diverse electronic environmental measurement devices and converted into a common transmittable data format.

60. A system for monitoring the suitability of an environment for a particular user, said system comprising:
means for accessing at a portable computer system a plurality of environmental indicators computed for a particular environment by a plurality of diverse electronic environmental measurement devices and converted into a common transmittable data format;
means for analyzing said plurality of environmental indicators for said particular environment with an environmental sensitivity profile of said particular user's sensitivities to environment as indicated by said environmental indicators stored at said portable computer system for a particular user; and
means for controlling output of a recommendation of suitability of said particular environment for said particular user, in response to said analyzing of said plurality of environmental indicators with said environmental sensitivity profile, such that said particular user receives an indication of whether said particular environment is suitable for said particular user.

61. The system for monitoring the suitability of an environment for a particular user according to claim 60, said system further comprising:
means for accessing at a portable computer system a plurality of environmental indicators computed for a particular remote environment by a plurality of diverse electronic environmental measurement devices and converted into a common transmittable data format.

62. A method for managing a controllable environment, said method comprising the steps of:
receiving at a portable computer system a plurality of environmental indicators computed for a particular environment by a plurality of diverse electronic environmental measurement devices and converted into a common transmittable data format;
comparing said plurality of environmental indicators for said particular environment with an environmental sensitivity profile of said particular user's sensitivities to environment as indicated by said environmental indicators for said particular user at said portable computer system; and
transmitting control signals for adjusting said particular environment to a plurality of environment control systems that control particular environmental parameters within said particular environment, in response to said comparison of said plurality of environmental indicators with said environmental sensitivity profile, such that said particular environment is adjusted to be suitable for said particular user.

63. A system for managing a controllable environment, said system comprising:

means for receiving at a portable computer system a plurality of environmental indicators computed for a particular environment by a plurality of diverse electronic environmental measurement devices and converted into a common transmittable data format;

means for comparing said plurality of environmental indicators for said particular environment with an environmental sensitivity profile of said particular user's sensitivities to environment as indicated by said environmental indicators for said particular user at said portable computer system; and means for transmitting control signals for adjusting said particular environment to a plurality of environment control systems that control particular environmental parameters within said particular environment, in response to said comparison of said plurality of environmental indicators with said environmental sensitivity profile, such that said particular environment is adjusted to be suitable for said particular user.

64. A program for managing a controllable environment, residing on a computer usable medium having computer readable program code means, said program comprising:

means for receiving at a portable computer system a plurality of environmental indicators computed for a particular environment by a plurality of diverse electronic environmental measurement devices and converted into a common transmittable data format;

means for comparing said plurality of environmental indicators for said particular environment with an environmental sensitivity profile of said particular user's sensitivities to environment as indicated by said environmental indicators for said particular user at said portable computer system; and means for transmitting control signals for adjusting said particular environment to a plurality of environment control systems that control particular environmental parameters within said particular environment, in response to said comparison of said plurality of environmental indicators with said environmental sensitivity profile, such that said particular environment is adjusted to be suitable for said particular user.

65. A method for managing an environmental control system, said method further comprising the steps of:

receiving at an environmental control system a plurality of requests in a common transmittable data format from a plurality of portable computer systems each respectively associated with one of a plurality of users, wherein said plurality of requests are received for adjusting a particular parameter of a particular environment as controlled by said environmental control system;

negotiating conflicts between said plurality of control signals and current environmental settings at said environmental control system; and controlling an adjustment of said particular parameter of said particular environment by said environmental control system, in response to said negotiation of conflicts between said plurality of controls signals and said current environmental settings, such that said particular parameter of said particular environment is adjusted according to requests from said plurality of users.

66. A system for managing an environmental control system, said system further comprising:

means for receiving at an environmental control system a plurality of requests in a common transmittable data format from a plurality of portable computer systems each respectively associated with one of a plurality of users, wherein said plurality of requests are received for adjusting a particular parameter of a particular environment as controlled by said environmental control system;

means for negotiating conflicts between said plurality of control signals and current environmental settings at said environmental control system; and means for controlling an adjustment of said particular parameter of said particular environment by said environmental control system, in response to said negotiation of conflicts between said plurality of controls signals and said current environmental settings, such that said particular parameter of said particular environment is adjusted according to requests from said plurality of users.

67. A program for managing an environmental control system, residing on a computer usable medium having computer readable program code means, said program comprising:

means for receiving at an environmental control system a plurality of requests in a common transmittable data format from a plurality of portable computer systems each respectively associated with one of a plurality of users, wherein said plurality of requests are received for adjusting a particular parameter of a particular environment as controlled by said environmental control system;

means for negotiating conflicts between said plurality of control signals and current environmental settings at said environmental control system; and means for controlling an adjustment of said particular parameter of said particular environment by said environmental control system, in response to said negotiation of conflicts between said plurality of controls signals and said current environmental settings, such that said particular parameter of said particular environment is adjusted according to requests from said plurality of users.

68. A method for accessing an environmental measurement device, said method comprising the steps of:

monitoring an environmental indicator for a particular environment at a first portable computer system, wherein said environmental indicator is received at said first portable computer system in a common transmittable data format from an environmental measurement device associated in location with said first portable computer system; and allowing a second portable computer system to access said environmental indicator from said first portable computer system in said common transmittable data format, in response to receiving a barter transaction at said first computer system from said second computer system, such that a second portable computer system may monitor said particular environment by bartering for said monitored environmental indicator from said environmental measurement device.

69. The method for accessing an environmental measurement device according to claim 68, said step of allowing a second portable computer system to access said environmental indicator from said first portable computer system in said common transmittable data format, further comprising the step of:

receiving a barter transaction of a negligible electronic payment at said first portable computer system from said second portable computer system.

70. The method for accessing an environmental measurement device according to claim 68, said method further comprising the steps of:

monitoring a second environmental indicator at said second portable computer system, wherein said second environmental indicator is received at said second portable computer system in said common transmittable data format from a second environmental measurement device associated with said second portable computer system; and allowing said second portable computer system to access said environmental indicator from said first portable computer system in said common transmittable data format, in response to bartering for access by allowing said first portable computer system to access said second environmental indicator from said second portable computer system in said common transmittable data format.

71. An electronic ecology network system, said system comprising:

a computer system associated with a particular user with access to a plurality of diverse electronic environmental measurement devices that compute environmental indicators for a particular environmental location that includes said particular user;

a communication medium between said computer system and a plurality of alternate computer systems, wherein said computed environmental indicators at said computer system are transmittable to said plurality of alternate computer systems via said communication medium; and a metering system associated with said computer system, wherein for each access to said computer environmental indicators at said computer system by said plurality of alternate computer systems an electronic charge accountable by said plurality of alternate computer systems is accumulated at said computer system.

* * * * *